(12) United States Patent
Russell et al.

(10) Patent No.: US 6,888,992 B2
(45) Date of Patent: May 3, 2005

(54) PHOTONIC CRYSTAL FIBRES

(75) Inventors: Philip St. John Russell, Bath (GB); Timothy Adam Birks, Bath (GB); Jonathan Cave Knight, Bath (GB)

(73) Assignee: Crystal Fibre A/S, Birkerod (DK)

( * ) Notice: Subject to any disclaimer, the term of this patent is extended or adjusted under 35 U.S.C. 154(b) by 0 days.

(21) Appl. No.: 10/702,733

(22) Filed: Nov. 7, 2003

(65) Prior Publication Data

US 2004/0105641 A1 Jun. 3, 2004

Related U.S. Application Data

(63) Continuation of application No. 09/890,793, filed as application No. PCT/GB00/00600 on Feb. 18, 2000.

(30) Foreign Application Priority Data

Feb. 19, 1999 (GB) ............................................. 9903918
Feb. 19, 1999 (GB) ............................................. 9903923

(51) Int. Cl.⁷ ................................................. G02B 6/02
(52) U.S. Cl. ......................... 385/125; 385/123; 65/385
(58) Field of Search ............................. 385/11, 39, 41, 385/122–126, 141–147; 65/385, 392, 428

(56) References Cited

U.S. PATENT DOCUMENTS

| | | |
|---|---|---|
| 3,516,239 A | 6/1970 | Fukuda et al. |
| 3,990,874 A | 11/1976 | Schulman |
| 4,127,398 A | 11/1978 | Singer, Jr. |
| 4,551,162 A | 11/1985 | Hicks |
| 5,056,888 A | 10/1991 | Messerly et al. |
| 5,155,792 A | 10/1992 | Vali et al. |
| 5,309,540 A | 5/1994 | Turpin et al. |
| 5,802,236 A * | 9/1998 | DiGiovanni et al. ........ 385/127 |
| 5,841,131 A | 11/1998 | Schroeder et al. |
| 6,631,234 B1 | 10/2003 | Russell et al. |

FOREIGN PATENT DOCUMENTS

| | | |
|---|---|---|
| EP | 0 520 653 | 12/1992 |
| EP | 1 153 325 B1 | 11/2001 |
| JP | 59-92940 | 11/1982 |
| SU | 753797 | 8/1980 |
| WO | 99/00685 | 1/1999 |
| WO | 00/06506 | 2/2000 |
| WO | 00/16141 A1 | 3/2000 |
| WO | 00/37974 | 6/2000 |
| WO | 00/49435 A1 | 8/2000 |
| WO | 00/49436 A1 | 8/2000 |
| WO | 03/058308 A2 | 7/2003 |

OTHER PUBLICATIONS

J.C. Knight, T.A. Birks, D.M. Atkin and P. St. J. Russell, "Pure silica–mode fibre with hexagonal photonic crystal cladding" OFC '96 Postdeadline paper, OFC 'Proceedings PD3–1, San Diego (1996) pp. 1–4.

J.C. Knight, T.A. Birks, P. St. J. Russell and D.M. Atkin, "All–silica single–mode optical fiber with photnic crystal cladding", Opt. Lett. 21, pp. 1547–1549 (1996).

(Continued)

Primary Examiner—Phan T. H. Palmer
(74) Attorney, Agent, or Firm—Burns, Doane, Swecker & Mathis, L.L.P.

(57) ABSTRACT

In a method of producing a photonic crystal fibre, a preform (300) that includes holes is formed and the preform (300) is drawn into a fibre. The method includes the step of applying a pressure differential to certain of the holes to control changes in the fibre structure during the draw.

10 Claims, 9 Drawing Sheets

OTHER PUBLICATIONS

J.C. Knight, T.A. Birks, R.F. Cregan, P. St. J. Russell and J.-P. de Sandro, "*Large mode area photonic crystal fibre*", Electron Lett. 34 pp. 1347–1348 (1998).

T.A. Birks, J.C. Knight and P. St. J. Russell, "*Endlessly single-mode photonic crystal fibre*", Opt. Lett. 22, pp. 961–963 (1997).

V.Ramaswamy and W.G. French, "*Influence of noncircular core on the polorization performance of single-mode fibres*", Electron, Lett. 14, pp. 143–144 (1978).

Kazuaki Yoshida et al. "*Fabrication and Characterization of Side-Hole Single-Mode Optical Fibers*", Opt. Fiber Technology, vol. 2, pp. 285–290 (1996).

R.F. Cregan et al., "*Single-mode Photonic Ban Cap Guidance of Light in Air*" Science, vol. 285, pp. 1537–1539, (Sep. 3, 1999.

Kazuo Shiraishi et al., "*Light-Propagation Characteristics in Thermally Diffused Expanded Core Fibers*", Journal of Lightwave Technology, vol. 11, pp. 1584–1591 (1993).

Notice of Opposition to a European Patent; Patent No. 1 153 325, Issued Sep. 24, 2003.

Scot C. Rashleigh "Origins and Control of Polarization Effects in Single-Mode Fibers"; Journal of Lightwave Technology, vol. LT-1, No. 2, Jun. 1983, pp. 312–331.

Chin–Lin Chen "An Analysis of High Birefringence Fibers", Journal of Lightwave Technology, vol. LT-5 No. 1, Jan. 1987, pp. 53–69.

Kun–Hsien Tsai et al., "General Solutions for Stress-Induced Polarization in Optical Fibers", Journal of Lightwave Technology, vol. 9, No. 1, Jan. 1991, pp. 7–17.

J.C. Knight et al., "Pure Silica Single-Mode Fibre with Hexagonal Photonic Crystal Cladding", Optical Fiber Communication, Postdeadline Papers, San Jose Convention Center, pp. 1–5.

T.A. Birks et al., "Full 2-D Photonic Bandgaps in Silica/Air Structures", Electronic Letters, vol. 31, No. 22, Oct. 26, 1995, pp. 1941–1943.

H.W. Fowler et al., "The Concise Oxford Dictionary of Current English", Clarendon Press, Oxford, Eighth Edition, 1990, pp. 685, 833, 886, 896.

Allan W. Snyder "Optical Waveguide Theory", Kluwer Academic Publishers, 2000, pp. 234–236, 355–359.

\* cited by examiner

PHOTONIC CRYSTAL FIBRES

CROSS-REFERENCE TO RELATED APPLICATIONS

The present application is a continuation of U.S. patent application Ser. No. 09/890,793, file date Nov. 8, 2001 which is a national phase application of PCT Application No. PCT/GB00/00600 filed Feb. 18, 2000. The contents of U.S. patent application Ser. No. 09/890,793 and PCT/GB00/00600 are hereby incorporated herein by reference.

FIELD OF THE INVENTION

This invention relates to photonic crystal fibres and to a method of producing photonic crystal fibres.

BACKGROUND OF THE INVENTION

A photonic crystal fibre is a special form of optical fibre. Optical fibres are used in many fields including telecommunications, laser machining and welding, laser beam and power delivery, fibre lasers, sensors and medical diagnostics and surgery. They are typically made entirely from solid transparent materials such as glass and each fibre typically has the same cross-sectional structure along its length. The transparent material in one part (usually the middle) of the cross-section has a higher refractive index than the rest and forms an optical core within which light is guided by total internal reflection. We refer to such a fibre as a standard fibre.

Single-mode optical fibres are preferred for many applications because of their superior wave-guiding properties. However, even so-called single-mode optical fibres do not generally offer adequate control over the polarisation of propagating light. A single-mode fibre is so called because it supports only one transverse spatial mode at a frequency of interest, but that spatial mode exists in two polarisation states; that is two degenerate modes that are polarised in orthogonal directions. In real fibres, imperfections will break the degeneracy of those modes and modal birefringence will occur; that is, the mode propagation constant $\beta$ will be slightly different for each of the orthogonal modes. Because the modal birefringence results from random imperfections, the propagation constants will vary randomly along the fibre. In general, light introduced into the fibre will propagate in both modes and will be coupled from one to the other by small bends and twists in the fibre. Linearly polarised light will be scrambled into an arbitrary polarisation state as it propagates along the fibre.

In order to maintain the polarisation of a mode in a standard fibre, birefringence can be deliberately introduced into the fibre (so that the effective indices of the two polarisation modes are different) in order to render insignificant the effects of small imperfections. If light is linearly polarised in a direction parallel to one of the optic axes of the fibre then the light will maintain its polarisation. If it is linearly polarised at some other angle, the polarisation will change, as the light propagates down the fibre, from linear to elliptical to linear (not parallel to the starting polarisation) to elliptical and back to linear again, with a period known as the beat length, $L_B$, where $$L_B = \frac{2\pi}{|\beta_x - \beta_y|}$$

and $\beta_x$ and $\beta_y$ are the propagation constants of the orthogonal modes. That variation is a consequence of a phase difference between two orthogonal components of the mode, which results from the difference in their propagation constants. The shorter the beat length, the more resilient is the fibre to polarisation-scrambling effects. Typically, conventional polarisation-preserving fibre has a beat length of the order of a millimeter. The strength of birefringence can also be represented by the parameter $$\beta = \frac{|\beta_x - \beta_y|}{K_0} = |n_x - n_y|,$$

where $$k_0 = \frac{2\pi}{\lambda}$$

where $\lambda$ is the wavelength) and $n_x$ and $n_y$ are the refractive indices seen by the orthogonal modes.

In the last few years a non-standard type of optical fibre has been demonstrated, called the photonic-crystal fibre (PCF). Typically, this is made from a single solid, and substantially transparent, material within which is embedded a periodic array of air holes, running parallel to the fibre axis and extending the full length of the fibre. A defect in the form of a single missing air hole within the regular array forms a region of raised refractive index within which light is guided, in a manner analogous to total-internal-reflection guiding in standard fibres. Another mechanism for guiding light is based on photonic-band-gap effects rather than total internal reflection. Photonic-band-gap guidance can be obtained by suitable design of the array of air holes. Light with particular propagation constants can be confined to the core and will propagate therein.

Photonic-crystal fibre can be fabricated by stacking glass canes, some of which are capillaries on a macroscopic scale, into the required shape, and then holding them in place while fusing them together and drawing them down into a fibre. PCF has unusual properties such as the ability to guide light in a single-mode over a very broad range of wavelengths, and to guide light having a relatively large mode area which remains single-mode.

Birefringence can be produced by several mechanisms. It can be caused by the anisotropic nature of the polarizability of a material; i.e. by anisotropy at an atomic level. It can be caused by the arrangement of elements of a material structure at a scale larger than atomic; that phenomenon is known as form birefringence. It can also be caused by mechanical stress; that phenomenon is known as stress birefringence or the photo-elastic effect. In standard fibres, form birefringence is achieved by changing the shape of the fibre cross-section; for example, by making the core or cladding elliptical. Birefringence in a weakly-guiding fibre is generally rather weak (B~$10^{-6}$). Stress birefringence can be induced by inserting rods of borosilicate glass on opposite sides of the fibre core in the fibre pre-form. Variation in the location and shape of the borosilicate rods can induce different levels of birefringence. Stress-induced birefringence permits B~$10^{-4}$.

The methods used to produce birefringence in standard fibres, and thus to produce standard polarisation-preserving fibres, are, in general, not directly suitable for use in photonic-crystal fibre.

An object of the invention is to provide a photonic crystal fibre which is birefringent so that the fibre can be used as a polarisation-preserving fibre. Another object of the invention is to provide a method of producing such a fibre.

SUMMARY

According to one embodiment of the invention there is provided a photonic crystal fibre comprising a bulk material having an arrangement of longitudinal holes and a guiding core, wherein the fibre has at most-two-fold rotational symmetry about a longitudinal axis (that is any longitudinal axis) and as a result of that lack of symmetry, the fibre is birefringent.

The arrangement of holes may be substantially periodic except for the presence of the core.

Advantageously, the birefringence is such that light with a wavelength of 1.5 microns propagating in the fibre has a beat length of less than 1 cm. More advantageously, the birefringence is such that light with a wavelength of 1.5 microns propagating in the fibre has a beat length of less than 5 mm. More advantageously, the birefringence is such that light with a wavelength of 1.5 microns propagating in the fibre has a beat length of less than 1 mm and preferably less than 0.5 mm; such short beat lengths are not generally obtainable in standard fibres. Of course, a particular fibre may not guide light at a wavelength of 1.5 microns; in that case, the beat length at a guided wavelength may be readily scaled up or down to an equivalent beat length at 1.5 microns. For example, a beat length of 1 mm at a wavelength of 1.55 microns is equivalent to a beat length of 0.41 mm at a wavelength of 633 nm, and a beat length of 0.5 mm at a wavelength of 1.55 microns is equivalent to a beat length of 0.21 mm at a wavelength of 633 nm.

It will be understood that in a real fibre there will inevitably be minor anomalies in the structure that mean that no fibre has absolute symmetry of any kind; in conventional photonic crystal fibres, however, it is readily apparent that the real fibre does have a considerable amount of rotational symmetry (most commonly six-fold rotational symmetry) and that symmetry is sufficiently strong to make the behaviour of the fibre similar to that of a theoretical fibre having absolute symmetry. In a similar way, where reference is made to a fibre having at-most-two-fold rotational symmetry, it should be understood that not only does the fibre not strictly have any higher symmetry but, furthermore, it does not behave as would a fibre which had a significant amount of higher symmetry.

In its broadest aspect, an embodiment of the invention is concerned with a lack of higher rotational symmetry in any aspect of the fibre. Most typically, the lack of symmetry may arise in some feature of the internal microstructure of the fibre and, commonly, of the arrangement of holes, while the overall cross-sectional shape of the fibre may be circular and thus have circular symmetry; it is within the scope of the invention for the arrangement of holes to have more-than-two-fold rotational symmetry but for the fibre to lack more-than-two-fold rotational symmetry in some other sense and examples of such arrangements are given below.

Preferably, the fibre has two-fold rotational symmetry.

Preferably, the rotational symmetry is about an axis passing through the core.

If a fibre has greater than two-fold rotational symmetry then linearly polarised light would have the same propagation constant β when polarised parallel to two or more (not necessarily orthogonal) axes. As is the case in a real fibre with circular symmetry, imperfections in the fibre will result in power transfer between modes polarised parallel to each of those axes. Consequently, light which is initially linearly polarised will excite additional modes and quickly become randomly polarised.

The core may include a hole. The hole may be filled with material other than air. Alternatively, the core may not include a hole.

The arrangement of holes may have at-most-two-fold rotational symmetry parallel to the longitudinal axis of the fibre. Alternatively, the arrangement of holes may have higher-than-two-fold rotational symmetry about an axis parallel to the longitudinal axis of the fibre. The rotational symmetry may be about an axis passing through the core.

The lack of higher rotational symmetry may at least partly result from a variation, across the cross-section of the fibre, in one or more of the following: the microstructure of the core, the diameter of the holes, the bulk material, the material contained in the holes or the shape of the holes. The shape variation may be due to deformation resulting from stresses in the fibre as it is drawn. The lack of higher rotational symmetry may result from a variation across the cross-section of the fibre, in one of the following in combination with one or more of the following or with a variation in another parameter: the microstructure of the core, the diameter of the holes, the bulk material, the material contained in the holes, the shape of the holes.

The birefringent fibre may have form birefringence and/or stress birefringence. Although form birefringence in standard fibres is not sufficient to give the required short beat length, the potentially much larger refractive index contrast in photonic crystal fibres can result in strong form birefringence. A new effect, not possible with standard fibres, is found when the pattern of stresses within the fibre during the draw process distorts certain of the air holes surrounding the fibre core along one axis, giving additional birefringence.

Also according to an embodiment of the invention, there is provided a method of producing a birefingent photonic crystal fibre, the method comprising the following steps:

(a) forming a stack of canes, at least some of which are capillaries, the stack including canes arranged to form a core region in the fibre and canes arranged to form a cladding region in the fibre; and (b) drawing the stack of canes into a birefringent fibre, which has at-most-two-fold rotational symmetry about a longitudinal axis.

Birefringence is thus introduced by modification of the method used to fabricate the photonic crystal fibre preform. The modification of the fabrication procedure may consist of the reduction in material symmetry to at-most-two-fold symmetric features in the periodic stack of canes which comprise the preform. Such structures will, in general, change both the shape of the guided mode and the pattern of stresses within the photonic crystal structure.

One way in which birefringence can be introduced is by including in the preform different capillaries at two-fold symmetric pairs of lattice sites. Those inclusions might be placed near to the core so as to alter the shape of the guided mode ("form birefringence") or they might be placed some way from the core but be made of a material with different properties, thus altering the pattern of stresses within the fibre core ("stress birefringence"). The preform may be structured so as to introduce birefringence by forming substantial parts of the fibre preform from a different type of capillary, which again introduces both stress and form birefringence. The basic periodic lattice which forms the waveguide cladding could be a simple close-packed array of capillaries with nominally identical external diameters or it could be an array of capillaries with generally different morphological characteristics, and forming different periodic structures. A square lattice may be formed from capillaries and rods with different diameters. Square and rectangular lattices can be used to build up naturally birefringent crystal structures for the cladding, simplifying the design of polarisation-preserving photonic crystal fibre.

The lack of higher rotational symmetry may at least partly result from variations, across the cross-section of the stack, in the internal diameters of the capillaries, in the material of which the canes are made, in the material with which the capillaries are filled and/or in the external diameter of the canes.

Canes may be provided at the vertices of a cladding lattice which has at-most-two-fold rotational symmetry about the centre of the canes arranged to form the core. Capillaries of selected internal diameters may be provided at the vertices of a cladding lattice which has at-most-two-fold rotational symmetry about the centre of the canes arranged to form the core, the selected diameters of the capillaries at the vertices of the cladding lattice being different from the diameters of the capillaries at other sites.

A substantial number of cladding canes, near to the canes arranged to form the core, may be different.

Birefringence may at least partly result from stresses formed within the fibre as it is drawn. The stress may be introduced by the inclusion, at sites having at-most-two-fold rotational symmetry, of a cane made from a different material from that of which at least some of the other canes in the lattice are made. The stress may be introduced by the inclusion, at sites having at-most-two-fold rotational symmetry, of capillaries having a different capillary wall thickness from that of at least some of the other capillaries.

The stresses may result in the deformation of holes surrounding the core of the drawn fibre and that deformation may result in birefringence.

The stresses may result in stresses in the core of the drawn fibre and those stresses may result in birefringence.

The lack of higher rotational symmetry may at least partly result from pressurisation and/or evacuation of at least one of the capillaries during the drawing of the stack.

In any of the above-described methods, the rotational symmetry of the stack of canes is preferably two-fold rotational symmetry.

Also according to an embodiment of the invention there is provided a method of producing a photonic crystal fibre, comprising:

(a) providing a plurality of elongate canes, each having a longitudinal axis, a first end and a second end, at least some of the canes being capillaries each having a hole parallel to the longitudinal axis of the cane and running from the first end of the cane to the second end of the cane;

(b) forming the canes into a stack, the canes being arranged with their longitudinal axes substantially parallel to each other and to the longitudinal axis of the stack;

(c) drawing the stack into a fibre whilst maintaining the hole of at least one capillary in communication with a source of fluid at a first pressure whilst maintaining the pressure around the capillary at a second pressure that is different from the first pressure, wherein the hole at the first pressure becomes, during the drawing process, a size different from that which it would have become without the pressure difference.

In the new method, substantial and controlled changes may occur in the fibre structure while it is being drawn; for example, there may also be controlled expansion of the air holes during the draw. In prior art photonic crystal fibres the required microstructure was created on a macroscopic scale, and then reduced in scale by drawing it into a fibre.

Preferably, the tube surrounds the stack of canes over at least a part of their length and the inside of the tube is maintained at the second pressure.

It will be understood that the phrase "expansion of the air holes" refers to production of air holes of a size (in cross-section taken perpendicularly to the longitudinal axis of the capillaries) greater than that which it would have been without the pressure difference. In reality, a fibre produced by drawing has a very much smaller total cross-sectional area than the preform (here the stack of canes) from which it is made, and the air holes in the invention will therefore not, in general, "expand" in absolute terms.

Changes during the draw can be thus controlled in two main ways: by use of a pressure differential applied to certain holes, and by enclosing the entire preform, preferably in a tube which is preferably thick walled and may comprise silica and is drawn down with and forms part of the final fibre. Preferably the tube does not undergo deformation significantly different from that which it would undergo without the pressure difference.

Preferably the tube restricts the expansion of at least one of the holes at the first internal pressure.

Preferably the stack of canes has at-most-two-fold rotational symmetry about any of the longitudinal axes. Such a stack may be used in the drawing of a birefringent fibre.

Preferably during the drawing process:
the tube is sealed to a first end of an evacuatable structure and the second end of the tube is within the evacuatable structure;
at least some of the capillaries pass through the evacuatable structure and are sealed to a second end thereof;
and the evacuatable structure is substantially evacuated in order to produce the second internal pressure.

Preferably the evacuatable structure is a metal tube.

BRIEF DESCRIPTION OF THE DRAWINGS

By way of example only, an embodiment of the invention will now be described, with reference to the accompanying drawings, of which:

FIG. 16b shows a detail of the structure near the core of the fibre of FIG. 16a;

FIG. 17b shows polarisation beating observed at a wavelength of 1550 nm in the fibre of FIG. 17a.

DETAILED DESCRIPTION OF THE PREFERRED EMBODIMENTS

Figure 1:
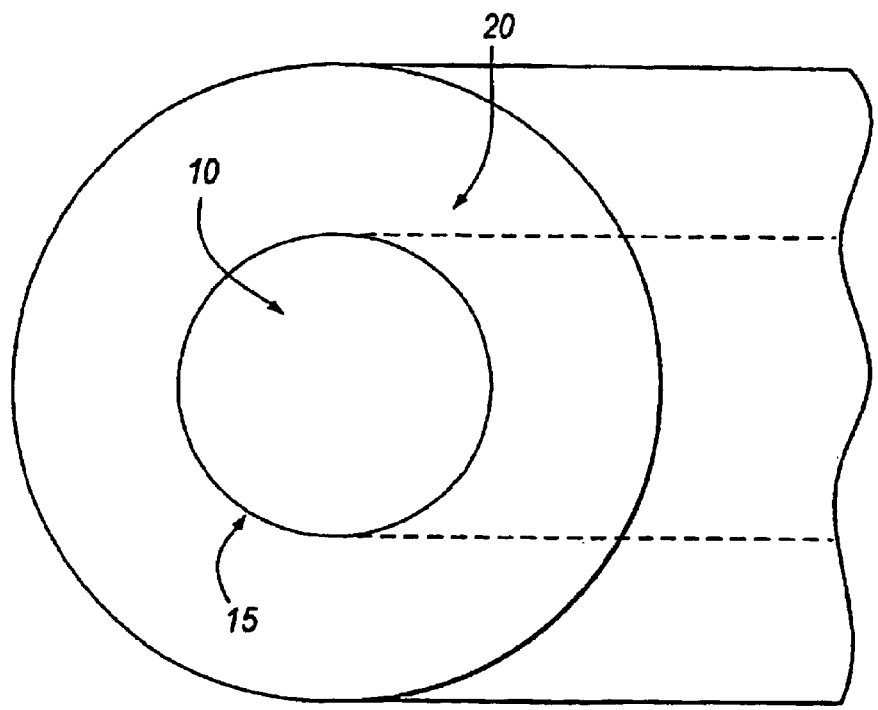
FIG. 1 is a schematic diagram of an example of a standard fibre.

Standard fibres, such as the example shown in FIG. 1, in their simplest form comprise essentially a cylindrical core 10 and concentric cylindrical cladding 20. Typically, both the core and the cladding will be made of the same material, usually silica, but each is doped with other materials in order to raise the refractive index of the core 10 and lower the refractive index of the cladding 20. Light, of appropriate wavelengths, is confined to the core 10, and guided therein, by total internal reflection at the core-cladding boundary 15.

Figure 2:
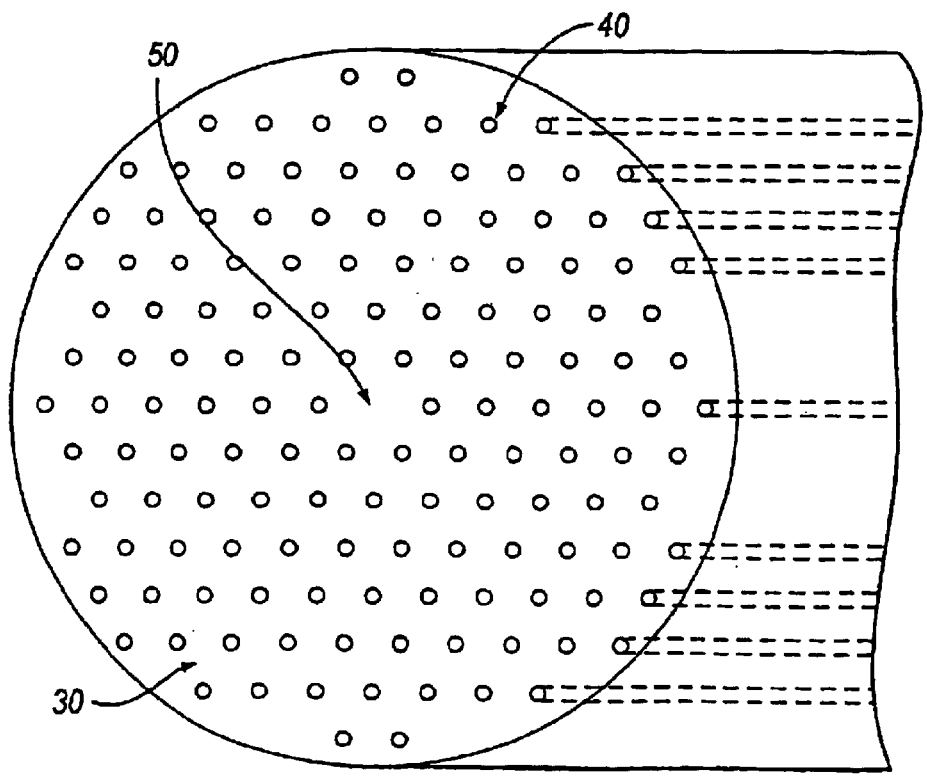
FIG. 2 is a schematic diagram of a conventional photonic-crystal fibre having a high-index core defect.

A typical photonic crystal fibre, shown in FIG. 2, comprises a cylinder of transparent bulk material 30 (e.g. silica) with a lattice of cylindrical holes 40, which run along its length. The holes are arranged at the vertices and centres of regular hexagons, which have six-fold rotational symmetry. The holes have a regular period, broken by the omission of one hole near the centre of the fibre. The region 50 of the fibre surrounding the site of the missing hole has the refractive index of the bulk material 30. The refractive index of the remainder of the fibre is attributable to the refractive index of both the bulk material 30 and the air in the holes 40. The refractive index of air is lower than that of, for example, silica and, consequently, the 'effective refractive index' of the material with the holes is lower than that of the region 50 surrounding the missing hole. The fibre can therefore confine light approximately to the region 50, in a manner analogous to waveguiding by total internal reflection in standard fibres. The region 50 is therefore referred to as the 'core' of the photonic crystal fibre.

Figure 3:
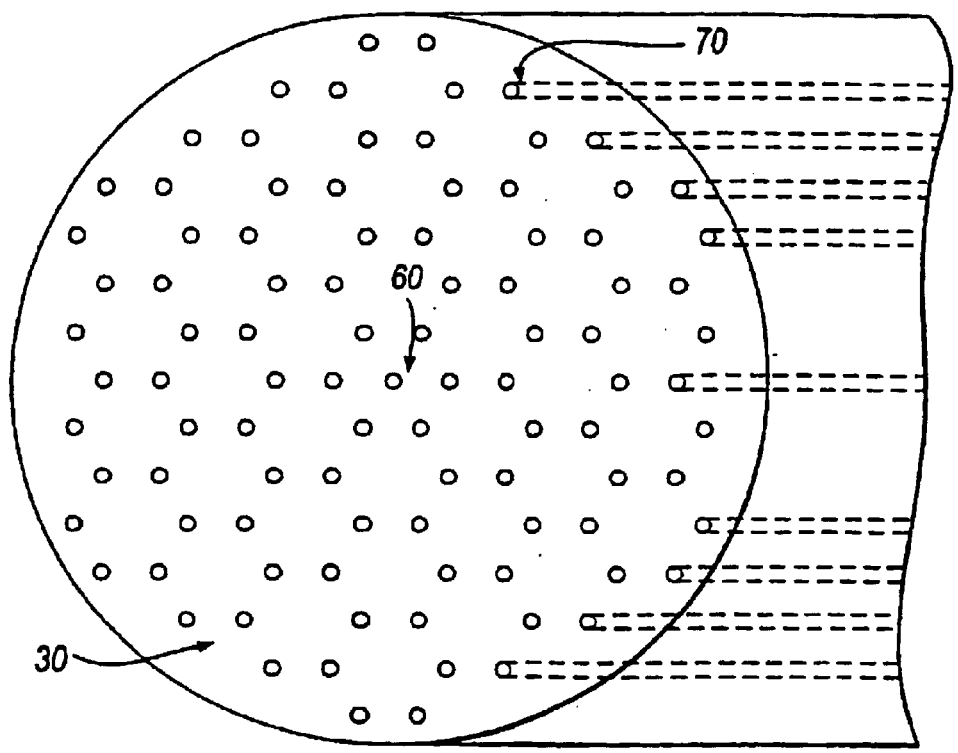
FIG. 3 is a schematic diagram of a conventional photonic-crystal fibre (a photonic-band-gap fibre) having a low-index core defect.

In another form of photonic crystal fibre, photonic band gap guidance acts to confine light to the fibre 'core'. In the example of such a fibre shown in FIG. 3, there is a matrix of holes 70 in bulk material 30. The holes are arranged at the vertices (but not the centres, cf. FIG. 2) of regular hexagons, which have six-fold rotational symmetry. The regularity of the matrix is again broken by a defect, but it is, in the illustrated example, an additional hole 60 at the centre of one of the lattice hexagons, that hexagon being near the centre of the fibre. The area surrounding the additional hole 60 can again be referred to as the core of the fibre. Disregarding (for the moment) hole 60, the periodicity of holes in the fibre results in there being a band-gap in the propagation constants of light which can propagate in the fibre. The addition of hole 60 effectively creates a region with a different periodicity, and that region can support propagation constants different from those supported in the rest of the fibre. If some of the propagation constants supported in the region of hole 60 fall within the band-gap of propagation constants forbidden in the rest of the fibre then light with those propagation constants will be confined to the core and propagate therein. Note that because the hole 60 is a low-index defect (it results in air being where bulk material would otherwise be), total internal reflection effects are not responsible for that waveguiding in the illustrated example.

Figure 4:
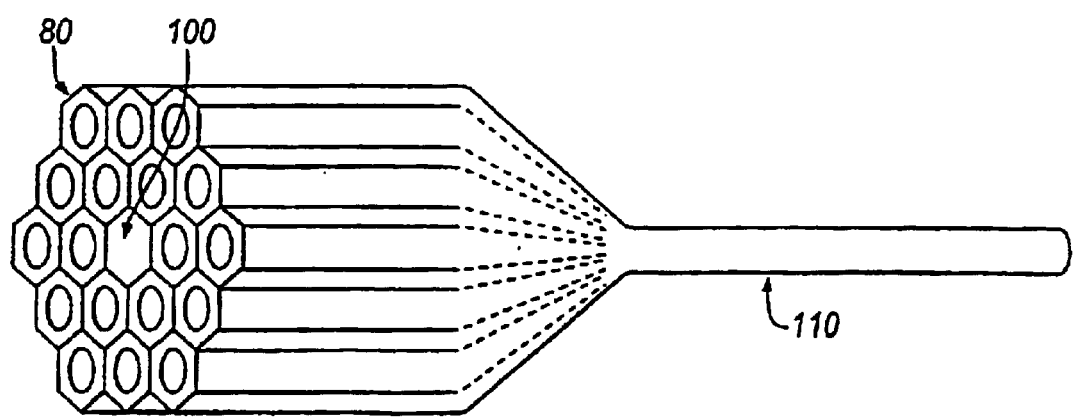
FIG. 4 is a schematic diagram of a photonic-crystal-fibre preform which has been partially drawn into a fibre.

Photonic crystal fibres can be manufactured by a process, one stage of which is shown in FIG. 4. In the first stages of that process (not shown), a cylinder of bulk material (e.g. silica), is milled so that it has a hexagonal cross-section, and a hole is drilled along its centre. The rod is then drawn into a cane using a fibre drawing tower. The cane is cut into lengths and the resulting, short canes 80 are stacked to form an array of canes, as shown in FIG. 4. The cane 100 at the centre of the illustrated array is not a capillary; i.e., it has no hole; the illustrated array will form an effective-index guidance type of fibre. The array of canes 80 is fused together and then drawn into the final photonic crystal fibre 110.

Figure 5:
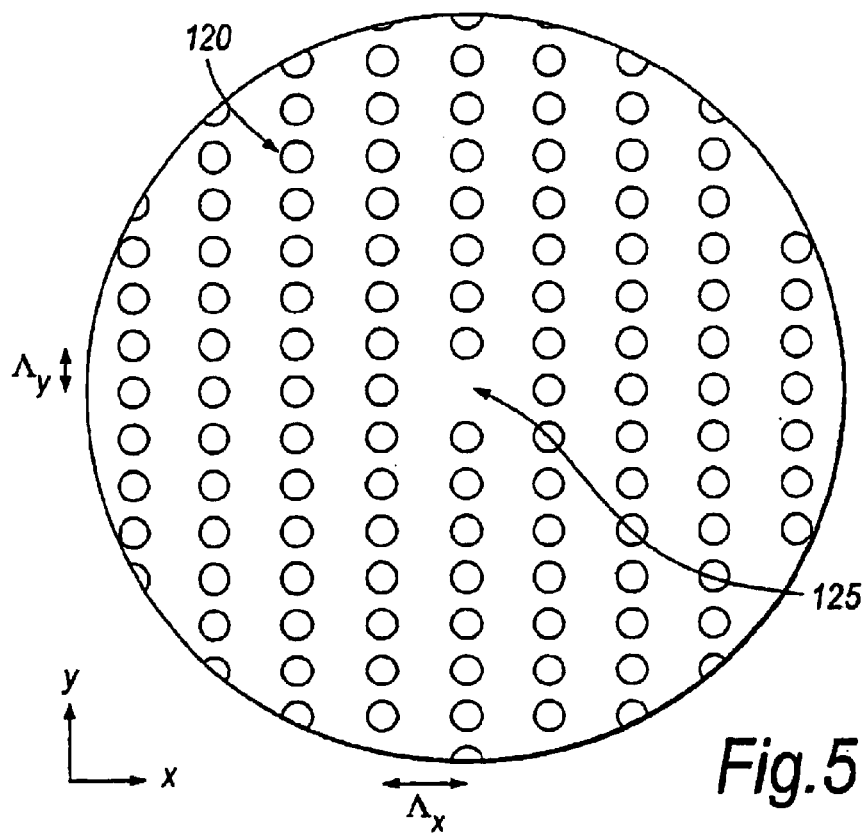
FIG. 5 is a schematic cross-sectional diagram of a first polarisation-preserving photonic-crystal fibre according to an embodiment of the invention, in which the cladding holes form a rectangular lattice.

The fibre shown in FIG. 5 has a lattice 120 of holes, which are arranged at the vertices of rectangles, which are not squares. The periodicity of the lattice is broken by the omission of a hole in the region 125 near the centre of the fibre cross-section. The center-to-center spacing (pitch) of the holes is different parallel to axis x (pitch $\Delta_x$) from the pitch ($\Delta_y$) parallel to axis y. The fibre shown in FIG. 5 could be manufactured using a cane which is milled to have a rectangular cross-section. The lattice of FIG. 5 has two-fold rotational symmetry and will therefore be birefringent.

Figure 6:
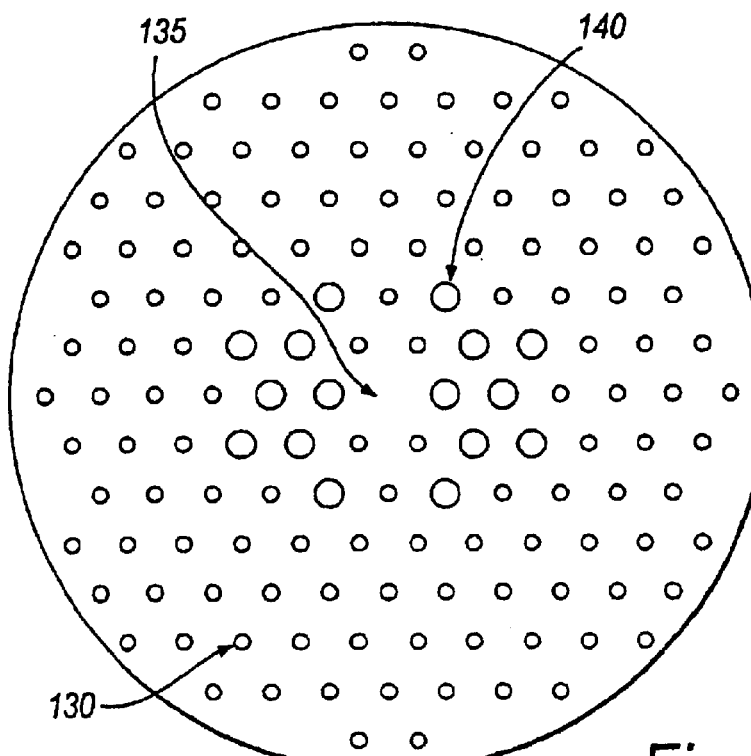
FIG. 6 is a schematic cross-sectional diagram of a second polarisation-preserving photonic-crystal fibre according to an embodiment of the invention, in which the pattern of cladding holes near to the core has two-fold symmetry.
Figure 7:
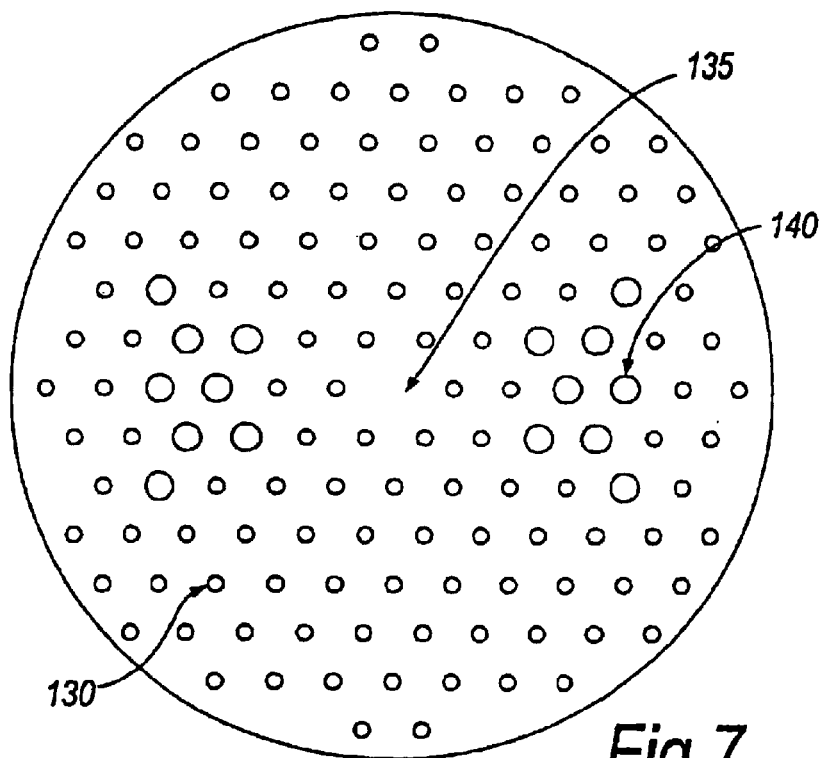
FIG. 7 is a schematic cross-sectional diagram of a third polarisation-preserving photonic-crystal fibre according to an embodiment of the invention, in which the pattern of cladding holes far from the core has two-fold symmetry.

FIGS. 6 and 7 show photonic crystal fibres which are effective-index-guidance fibres having a hexagonal lattice similar to that of the fibre of FIG. 2. Such lattices are not intrinsically birefringent. However, in the lattices of FIG. 6 and 7, holes 140 are of a larger diameter than holes 130. That anisotropy in the lattice creates a two-fold rotationally symmetric pattern of holes about the region 135 where a hole is missing from the lattice.

The pattern of large holes 140 in FIG. 6 has an effect analogous to that of form birefringence in a standard fibre. The variation of hole diameter near to the 'core' 135 directly creates a variation in the effective index seen by a guided mode.

The pattern of large holes 140 in FIG. 7 produces stresses in the core which cause birefringence in the same way that birefringence is caused in standard fibres. A new effect, not possible with standard fibres, is that the pattern of stresses within the fibre can, during the draw process, distort some of the air holes surrounding the fibre core 135 along one axis, giving additional birefringence.

Figure 8:
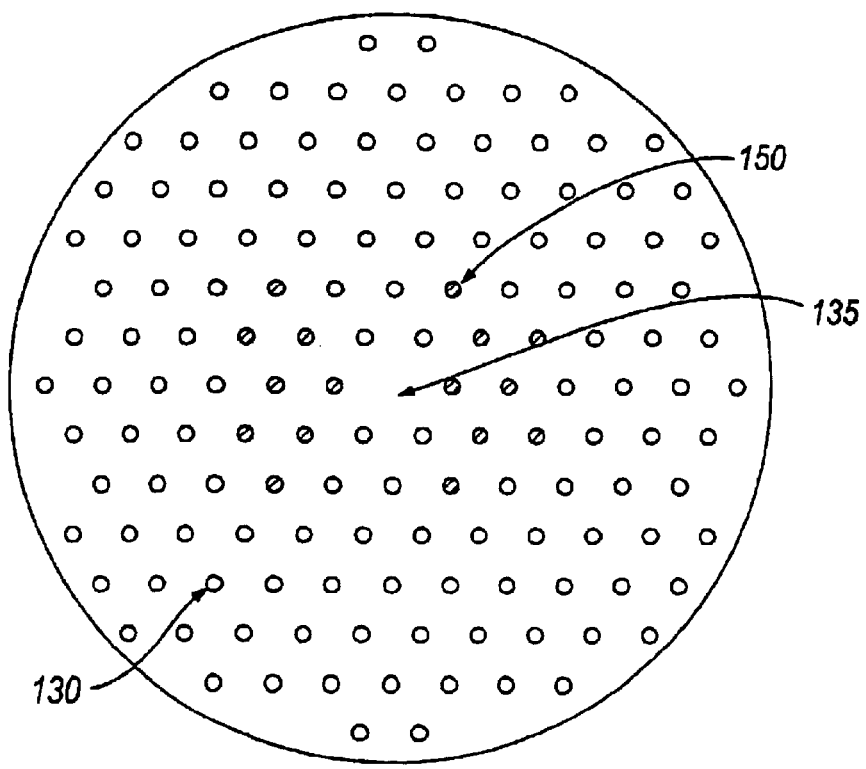
FIG. 8 is a schematic cross-sectional diagram of a fourth polarisation-preserving photonic-crystal fibre according to an embodiment of the invention, in which the pattern of dielectric inclusions in the cores of the lattice has two-fold symmetry.

Another alternative, illustrated in FIG. 8, is for some of the holes 150 to be filled with material other than air (so that they have a different dielectric constant). Again, the six-fold rotational symmetry of the lattice is reduced to a two-fold rotational symmetry.

Figure 9:
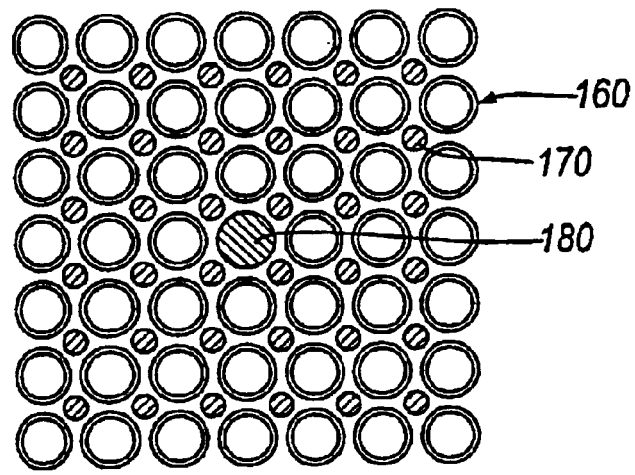
FIG. 9 is a schematic cross-sectional diagram of an arrangement of canes for forming a photonic crystal fibre having a square lattice.

The stack of canes shown in FIG. 9 are of three types: large diameter canes 160 which are capillaries, small diameter solid canes 170 and a large diameter solid cane 180. The canes are arranged so that the large diameter canes 160 form a square lattice, which is broken by a defect at a central site, the defect being the large diameter solid cane 180. Interstitial gaps, resulting from the non-tesselating nature of the circular cross-sections of canes 160, are filled by small diameter canes 170.

Figure 10:
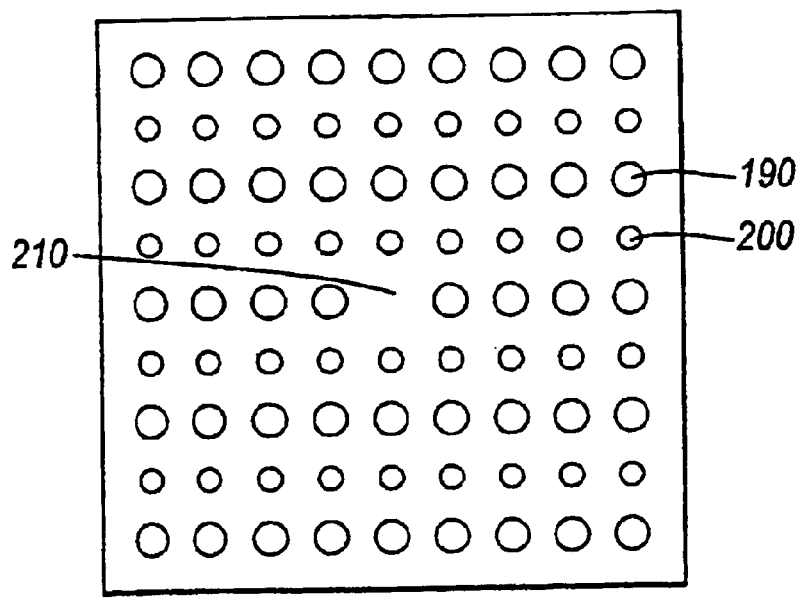
FIG. 10 is a schematic cross-sectional diagram of a portion of a photonic crystal fibre having a square lattice of holes each having one of two different diameters.

A photonic crystal fibre having two-fold symmetry is shown in FIG. 10. The fibre has a lattice structure which can be constructed from a stack of canes arranged in a manner similar to the stack of FIG. 9. Solid cane 180 results in a defect similar to defect 210. In this case, however, alternate rows of holes (190, 200) have large and small diameters respectively. Such an effect could be achieved with the lattice of FIG. 9 by providing alternate rows of canes 160 with large and small internal diameters (but with constant external diameters).

Figure 11:
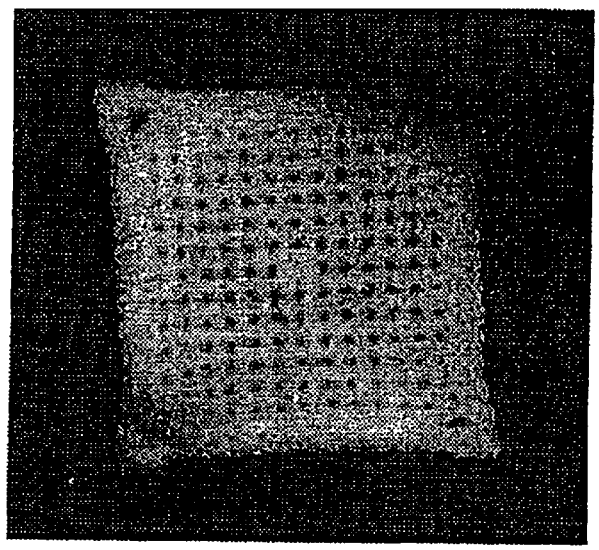
FIG. 11 shows a photonic crystal fibre having a square lattice.

The fibre of FIG. 11 can be seen to have approximately a square lattice such as might be produced from the stack of FIG. 9.

Figure 12:
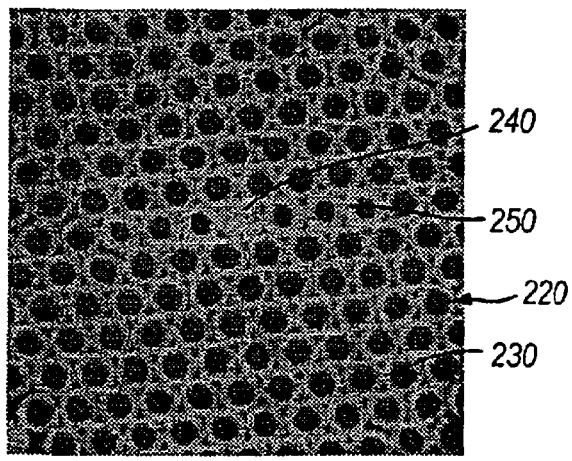
FIG. 12 shows canes forming part of a stack for forming a photonic crystal fibre.
Figure 13:
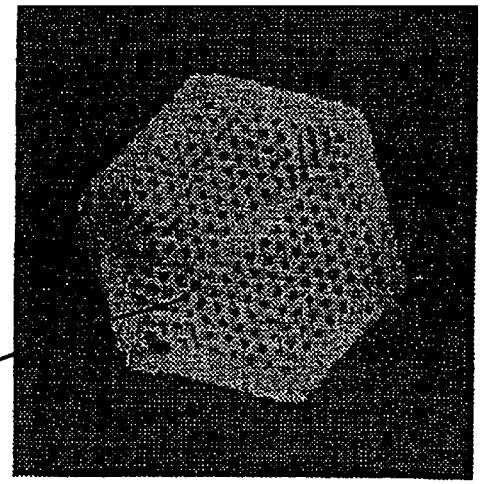
FIG. 13 shows a photonic crystal fibre formed from a stack such as that shown in FIG. 12.

FIG. 12 shows a stack of canes 220 which are capillaries. The canes are arranged on an hexagonal lattice, with the periodicity of the structure broken by a solid cane 240. It will be noted that a row of canes about half-way up the photograph are capillaries with thicker walls 250 than the walls 230 of other capillaries. When a fibre is drawn from the stack of canes, such an arrangement will result in a fibre, such as that shown in FIG. 13, having a row of holes 260 having a smaller diameter than other holes in the fibre.

Many other patterns of capillaries and canes, varying in various parameters, could be envisaged that would fall within the scope of the invention.

Figure 14:
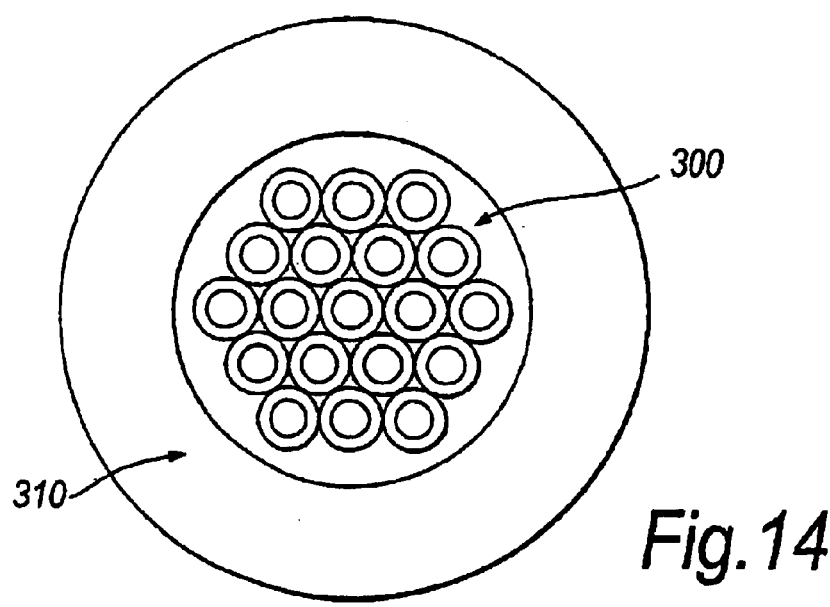
FIG. 14 shows schematically a stack of capillaries suitable for use in a further method according to the invention.
Figure 15:
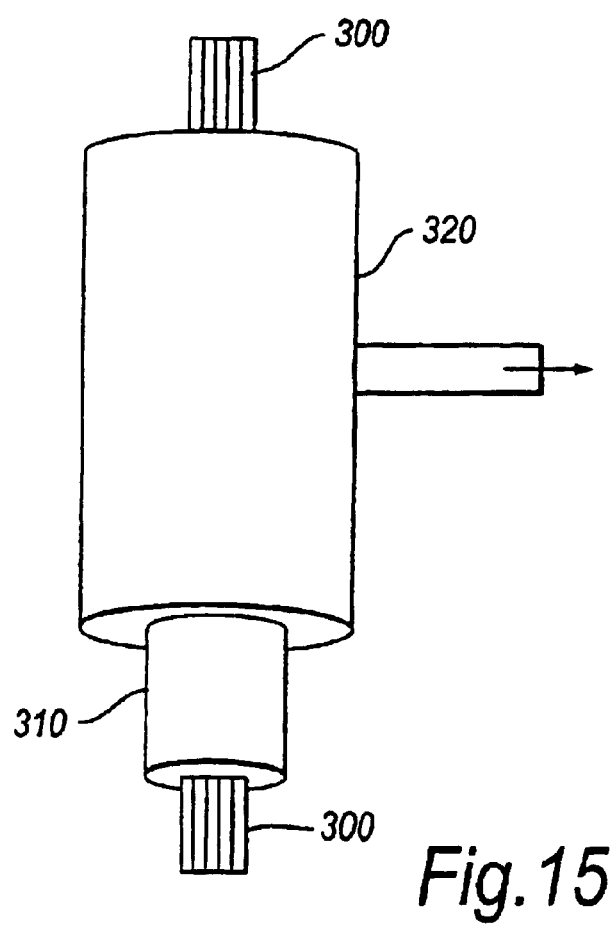
FIG. 15 shows schematically apparatus used with the stack of FIG. 14.

Another method of making a fibre is illustrated in FIGS. 14 and 15. A stack of a regular array of capillaries 300 are placed inside a thick-walled silica glass tube 310 (FIG. 14). The silica glass tube 310 forms part of the fibre after drawing, serving as a jacket to provide mechanical strength. During the drawing process (FIG. 15), the inside of the tube 310 is evacuated by sealing it within an evacuatable structure while the inside of some or all of the capillaries 300 are kept at a different and higher pressure, for example, because they are left open to the atmosphere.

The evacuatable structure is a brass cylinder 320. Initially it is open at both ends. The cylinder is then sealed to the tube 310 at one end. The tube terminates within the brass cylinder 320. Some or all of the capillaries 300 pass right through the brass cylinder 320, which is then sealed around those capillaries that pass right through the cylinder at the top. The brass cylinder 320 is evacuated during the drawing process.

During the drawing process, in which the tube 310 and the capillaries 300 are drawn downwardly from the brass tube, the outer tube 310 does not collapse, despite being evacuated, because it has thick walls. In contrast, interstitial holes between capillaries 300 which are already smaller and have relatively thin boundaries defined by walls of the capillaries quickly collapse and are not present in the final fibre (which is desirable). Capillaries which are evacuated will also collapse completely if there is a higher pressure around the capillary. On the other hand capillaries which are filled with atmospheric-pressure air expand.

Figure 16A:
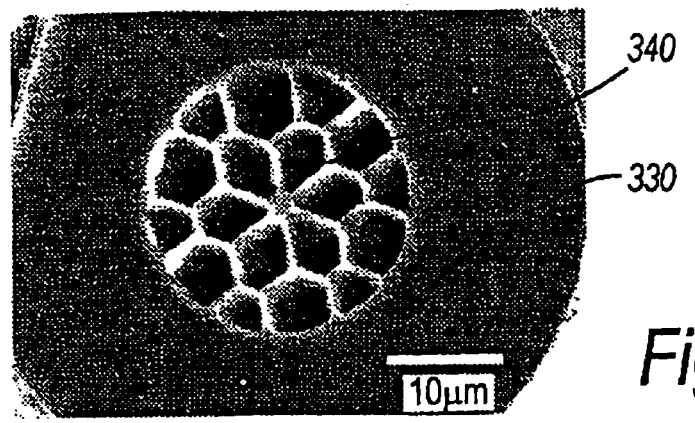
FIG. 16a shows the cleaved end face of a photonic crystal fibre made from a preform similar to that of FIG. 14 and with the apparatus of FIG. 15.
Figure 16B:
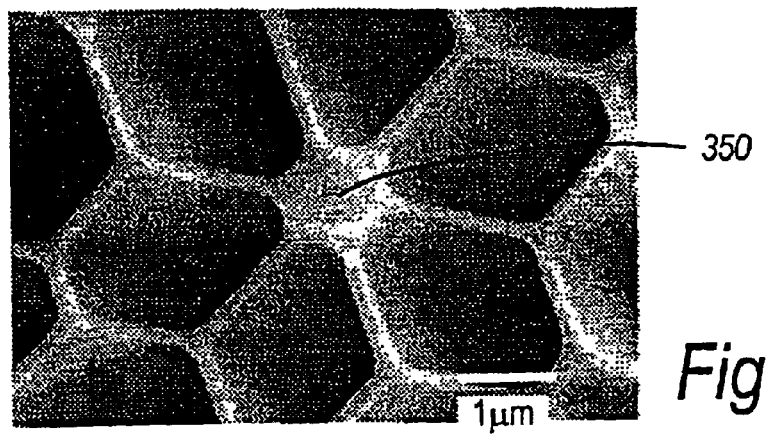

By adopting the method just described it is possible to form very regular and thin-walled structures and to make fibres with very small guiding cores. FIG. 16 shows such a fibre which has an outer cladding 330 comprising the tube 310 after drawing and an inner cladding 340 comprising the capillaries 300. The inner cladding is of approximately 10 $\mu$m radius and comprises a honeycomb structure of expanded holes. The holes surround a guiding core 350 that is of approximately 1 $\mu$m diameter and has been formed from an elongate cane that is not a capillary. It will be appreciated that the fibre shown in FIG. 16 is made by having all the capillaries 300 passing right through the cylinder 320 and has substantial multi-fold rotational symmetry; thus the fibre is not substantially birefringent.

Figure 17A:
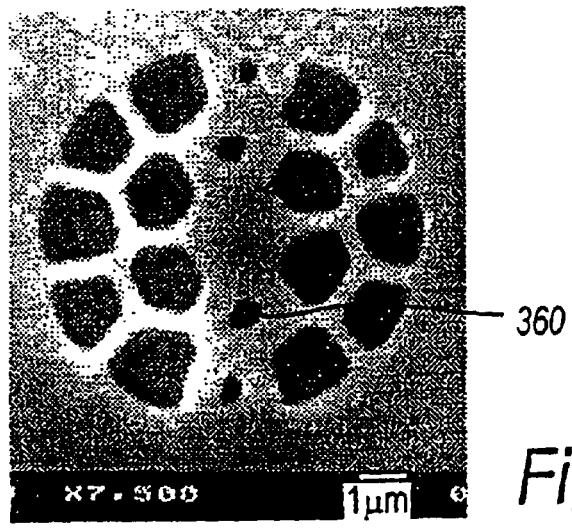
FIG. 17a shows a highly birefringent fibre made with the apparatus of FIG. 15.

In contrast FIG. 17a shows a fibre that is made to be highly birefringent by stacking thicker-walled capillaries at certain sites; smaller air holes 360 are formed at those sites. An alternative method of producing the fibre might be by having four selected capillaries terminating within the cylinder 320; the holes in those selected capillaries 300 would not expand during drawing and would thereby provide the four small holes 360. The fibre of FIG. 17a is highly birefringent because it has only two-fold symmetry resulting from the four smaller holes 360 lying along a diameter of the inner cladding, either side of the core.

Figure 17B:
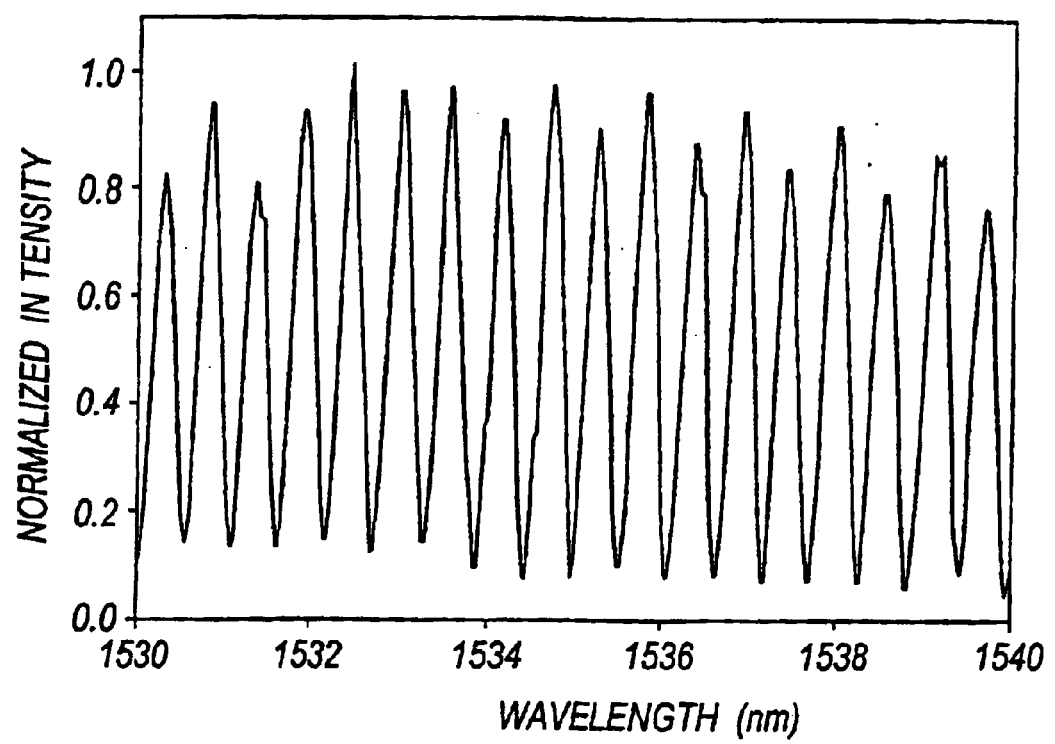

FIG. 17b shows the polarisation beating data of the fibre of FIG. 17a. From the data, the beat length of the fibre can be shown to be 0.92 mm at a wavelength of 1550 nm; such a beat length is sufficiently short for the fibre to act as a polarisation-maintaining, single mode photonic crystal fibre.

Although only preferred embodiments are specifically illustrated and described herein, it will be appreciated that many modifications and variations of the present invention are possible in light of the above teachings and within the purview of the appended claims without departing from the spirit and intended scope of the invention.

What we claim is:

1. A method of making a photonic crystal fibre, comprising:
    (i) providing a plurality of elongate canes, each having a longitudinal axis, a first end and a second end, at least some of the canes being capillaries each having a hole parallel to the longitudinal axis of the cane and running from the first end of the cane to the second end of the cane;
    (ii) forming a preform by forming the canes into a stack and fusing them together, the canes being arranged with their longitudinal axes substantially parallel to each other and to the longitudinal axis of the stack;
    (iii) drawing the preform into the fibre whilst maintaining the hole of at least one capillary in communication with a source of fluid at a first pressure whilst maintaining the pressure around the said hole at a second pressure, wherein the hole at the first pressure becomes, during the drawing process, a size different from that which it would have become without the pressure difference.

2. A method as claimed in claim 1, in which a tube having a first end and a second end surrounds the stack of canes over at least a part of their length and the inside of the tube is maintained at the second pressure.

3. A method as claimed in claim 2, in which, during the drawing process: (A) the tube is sealed near to the first end to a first end of an evacuatable structure and the second end of the tube is within the evacuatable structure; (B) at least some of the capillaries pass through the evacuatable structure and are sealed to a second end thereof; and (C) the evacuatable structure is substantially evacuated in order to produce the second internal pressure.

4. A method as claimed in claim 3, in which the evacuatable structure is a metal tube.

5. A method as claimed in claim 2, in which the tube does not undergo deformation significantly different from that which it would undergo without the pressure difference.

6. A method as claimed in claim 2, in which the tube restricts the expansion of at least one of the holes that is at the first pressure.

7. A method as claimed in claim 1, in which the preform has at-most-two-fold rotational symmetry about any of the longitudinal axes.

8. A method as claimed in claim 1, in which the preform is enclosed in a tube that is drawn down with and forms part of the drawn fibre.

9. A method as claimed in claim 1, in which there is controlled expansion of at least some of the holes during the draw.

10. In a method of making a photonic crystal fibre, comprising forming a preform by fusing a plurality of elongate canes, at least some of the canes being capillaries and drawing said preform to form the fiber, the improvement comprising pressurization or evacuation of at least one of the holes provided by the capillaries during the drawing whilst maintaining said hole in communication with a source of fluid at a first pressure different from atmospheric pressure, so that the hole at the first pressure becomes, during the drawing process, a size different from that which it would have become without the pressure difference.

* * * * *